(12) United States Patent
Ezra

(10) Patent No.: US 7,983,894 B2
(45) Date of Patent: Jul. 19, 2011

(54) DATA PROCESSING

(75) Inventor: Rabin Ezra, Barking (GB); Solomon Ezra, legal representative, Barking (GB)

(73) Assignee: Sony Computer Entertainment Inc. (JP)

( * ) Notice: Subject to any disclaimer, the term of this patent is extended or adjusted under 35 U.S.C. 154(b) by 560 days.

(21) Appl. No.: 11/429,410

(22) Filed: May 5, 2006

(65) Prior Publication Data

US 2007/0043551 A1    Feb. 22, 2007

(30) Foreign Application Priority Data

May 9, 2005    (GB) .................................. 0509423.0

(51) Int. Cl.
  *G06F 9/455*    (2006.01)
(52) U.S. Cl. ........................................................ 703/26
(58) Field of Classification Search ................. 703/23, 703/26; 712/203, 205, 215, 235
  See application file for complete search history.

(56) References Cited

U.S. PATENT DOCUMENTS

| | | | |
|---|---|---|---|
| 5,966,515 A | 10/1999 | Alferness | |
| 6,021,484 A | 2/2000 | Park | |
| 6,058,465 A * | 5/2000 | Nguyen | ............................ 712/7 |
| 6,742,110 B2 * | 5/2004 | Djafarian et al. | ............. 712/215 |
| 6,826,522 B1 | 11/2004 | Moller et al. | |
| 7,370,243 B1 * | 5/2008 | Grohoski et al. | ................ 714/48 |
| 2003/0074543 A1 * | 4/2003 | Djafarian et al. | ............. 712/212 |
| 2003/0149964 A1 | 8/2003 | Hoogerbrugge et al. | |
| 2004/0015888 A1 | 1/2004 | Fujii et al. | |
| 2004/0117172 A1 | 6/2004 | Shibata | |
| 2005/0262329 A1 * | 11/2005 | Krishnan et al. | .............. 712/210 |
| 2007/0204137 A1 * | 8/2007 | Tran | .............................. 712/214 |

FOREIGN PATENT DOCUMENTS

EP    0 464 494    1/1992

OTHER PUBLICATIONS

Great Britain Search Report dated Aug. 23, 2005, for corresponding Great Britain Application GB0509423.0.
PCT/ISA/210 International Search Report for corresponding PCT application PCT/GB2006/01666, dated Aug. 11, 2006.
Communication from corresponding European Application No. 06727034 dated Feb. 10, 2010.

* cited by examiner

*Primary Examiner* — Paul L Rodriguez
*Assistant Examiner* — Andre Pierre Louis
(74) *Attorney, Agent, or Firm* — Lerner, David, Littenberg, Krumholz & Mentlik, LLP

(57) ABSTRACT

A data processor is arranged to execute software to emulate an instruction-handling processor having an instruction preparation stage and an instruction execution stage. The software is operable first to emulate the instruction preparation stage in respect of a group of two or more instructions to generate a group of prepared instructions; and then to emulate the instruction execution stage in respect of the group of prepared instructions, so that the completion of the emulation of the instruction execution stage in respect of each of the prepared instructions occurs serially in an instruction order.

17 Claims, 6 Drawing Sheets

DATA PROCESSING

BACKGROUND OF THE INVENTION

1. Field of the Invention

This invention relates to data processing.

2. Description of the Prior Art

The present invention is applicable to pipelined data processing and non-pipelined data processing. Technical background will be described with respect to a pipelined system merely to indicate a problem to be addressed.

So-called "pipelined" data processing is known, in which the operations required to handle a data processing instruction are carried out over two or more successive instruction-handling cycles (e.g. processor clock cycles).

For example, in a pipelined data processor, an instruction might be "fetched" or retrieved from memory during a first cycle under the control of a "program counter", "decoded" during the next cycle in order to determine the meaning of the instruction and its operands, and then "executed" during a third cycle. This happens repeatedly so that while one instruction is at a certain stage in the pipeline, other instructions are at different stages, the aim being to keep the whole pipeline fully occupied as much as possible.

A problem can arise when it is desired to emulate such a pipeline using software running on another data processor.

In an emulation situation like this, each hardware operation of the data processor to be emulated is executed by a software subroutine on the emulating processor. The equivalent of the clock cycle period thus depends on the speed of operation of the slowest of these subroutines, which in turn depends on the number of operations that the emulating processor needs in order to carry out the emulated task.

The emulation clock speed has to be set to allow for this slowest emulation task. In a system which emulates real time operations or interacts with any external processing apparatus, the emulation clock speed has to be kept constant. That is to say, the emulation clock cannot be speeded up or slowed down to suit the current instruction being executed.

This can all have a further effect on the emulation of a pipelined processor, which is to restrict the ability to emulate the pipeline so that the fetch, decode and execute operations take place at the same time in respect of different instructions. Rather, a system is generally used in which each instruction is fetched, decoded and executed before the next is fetched and so on. This means that the execution of four instructions I1, I2, I3 and I4 would take twelve emulation clock cycles:

| | |
|---|---|
| first emulated clock cycle | fetch I1 |
| second emulated clock cycle | decode I1 |
| third emulated clock cycle | execute I1 |
| fourth emulated clock cycle | fetch I2 |
| fifth emulated clock cycle | decode I2 |
| sixth emulated clock cycle | execute I2 |
| ... | ... |
| twelfth emulated clock cycle | execute I4 |

SUMMARY OF THE INVENTION

This invention provides a data processor arranged to execute software to emulate an instruction-handling processor having an instruction preparation stage and an instruction execution stage, the software being operable:

first to emulate the instruction preparation stage in respect of a group of two or more instructions to generate a group of prepared instructions; and then to emulate the instruction execution stage in respect of the group of prepared instructions, so that the completion of the emulation of the instruction execution stage in respect of each of the prepared instructions occurs serially in an instruction order.

The invention makes use of a hybrid approach—neither (for example) a single pipeline nor a superscalar pipeline—to achieve an improvement in the emulation speed of an instruction-handling processor. A group of two or more instructions is prepared (e.g. the instructions are fetched and decoded) before any of the instructions in the group is executed (in the emulation). The emulation then completes the execution of the instructions one after the other, in an instruction order.

This can achieve an improvement in an emulated system because the software processing needed to emulate the fetching and decoding of an instruction is often much less onerous than the processing required to emulate the execution of an instruction.

So, in an example having a group of four instructions I1, I2, I3 and I4, the emulation processing might proceed as follows:

| | |
|---|---|
| first emulated clock cycle | fetch I1-I4 |
| second emulated clock cycle | decode I1-I4 |
| third emulated clock cycle | execute I1 |
| fourth emulated clock cycle | execute I2 |
| fifth emulated clock cycle | execute I3 |
| sixth emulated clock cycle | execute I4 |

Accordingly, the example situation, which took twelve emulated clock cycles in the example described earlier, now takes six emulated clock cycles.

In embodiments of the invention the pipeline is at least a three-stage pipeline, in that the instruction preparation stage comprises an instruction fetching stage and an instruction decoding stage.

Efficiency of operation can be improved in embodiments of the invention in which the instructions are held, before being subject to instruction preparation, in a cache comprising one or more cache lines; and the number of instructions in the group is selected so as to avoid the group comprising instructions from more than one cache line.

This invention also provides a data processing method in which software is executed to emulate an instruction-handling processor having at least an instruction preparation stage and an instruction execution stage, the method comprising the steps of:

first emulating the instruction preparation stage in respect of a group of two or more instructions to generate a group of prepared instructions; and then emulating the instruction execution stage in respect of the group of prepared instructions, so that the completion of the emulation of the instruction execution stage in respect of each of the prepared instructions occurs serially in an instruction order.

Further aspects of the invention include computer software comprising program code to carry out this method; and a medium (e.g. a transmission medium or a storage medium) by which such program code is provided.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
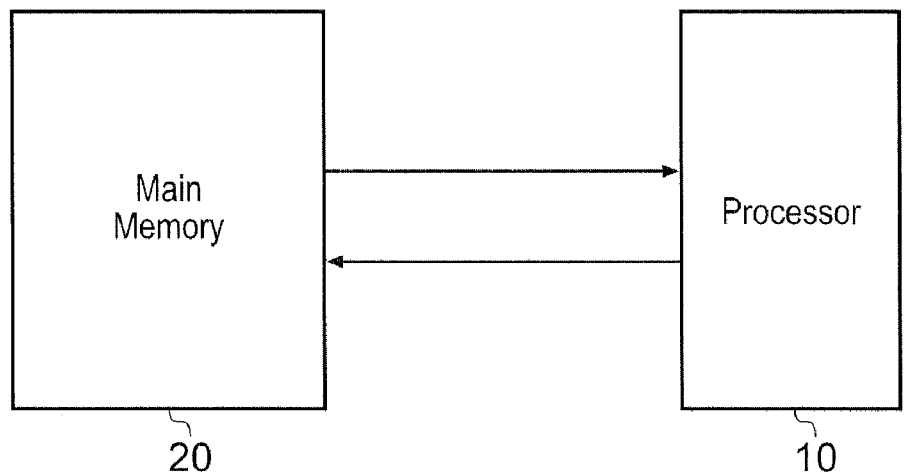
FIG. 1 schematically illustrates a data processing system.

FIG. 1 schematically illustrates a data processing system to be emulated. The system comprises a processor 10 which reads data and instructions from, and writes data and modified instructions to, a main memory 20.

The following description relates to a technique for emulating the operation of the system of FIG. 1 using a processor whose local memory is too small to hold an image of the main memory 20 of the system to be emulated. Because of this restriction, a cache strategy has to be employed.

Figure 2:
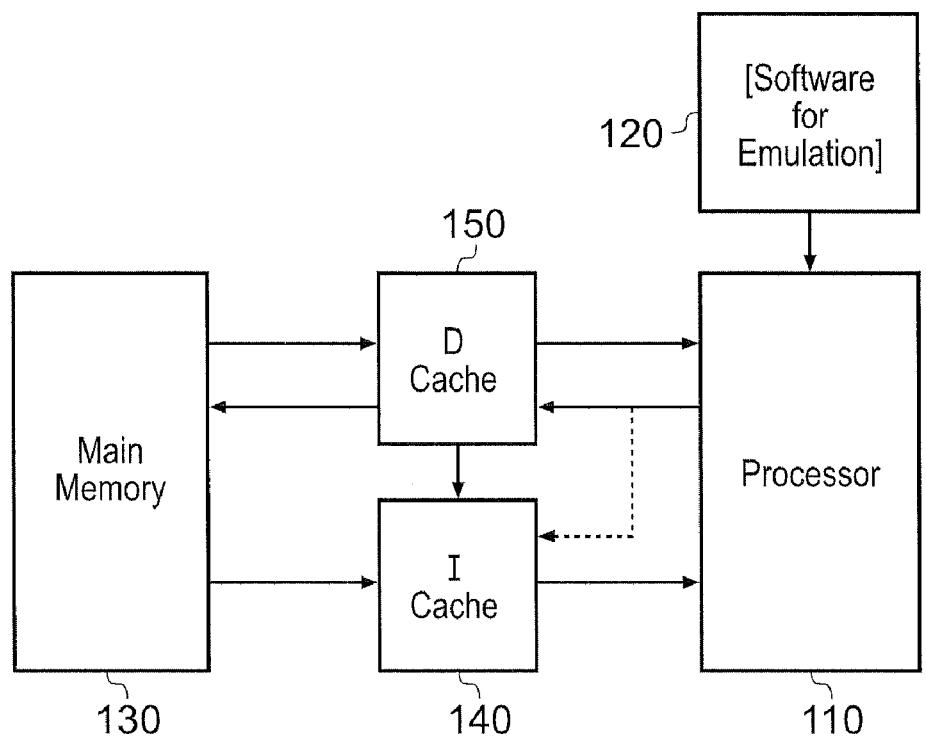
FIG. 2 schematically illustrates a data processing system using data and instruction caches.

FIG. 2 schematically illustrates the emulation arrangement. Emulation techniques are generally well known, and features which are not directly relevant to the present embodiment are omitted for clarity. Emulation involves an emulation processor running emulation software written in a language native to the emulation processor, so that a group of such native instructions are run in order to emulate the handling of an instruction in the emulated system. In the description which follows, the term "instruction" will refer to an instruction in the emulated system, and not to a native instruction of the emulation software.

Referring to FIG. 2, a processor (in this case a parallel or "vector" processor) 110 running emulation software 120 accesses a main memory 130 via an instruction cache (I) 140 and a data cache (D) 150. The reason that the I cache and the D cache are used is that the memory local to the processor 110 is too small to hold an image of the main memory 20 of the emulated system, and the main memory 130 associated with the processor 110 has to be accessed via an expensive (i.e. time consuming DMA accesses.

The I cache 140 is direct mapped for speed of access and holds 8 memory pages of 4 kilobytes each. A small number of large memory pages are used in this embodiment to make the process of checking for a cache hit more efficient. Large page sizes amortize slow memory accesses. Memory pages may be read from the main memory 130 into the I cache 140, and the processor may read auctions from the I cache 140. However, values stored in the I cache 140 are never written back to the main memory 130.

The D cache 150 is fully associative to reduce so-called "thrashing"—i.e. a rapid changing of the cached pages—and again holds 8 pages of 4 kilobytes each. When a new page is to be read to the D cache from the main memory 130, a least-recently-accessed page stored in the D cache is written back to the main memory (if that page has been changed). So, if the processor modifies any stored data in the D cache, the modification is held in the D cache 150 until that page is written back to the main memory 130.

Figure 3:
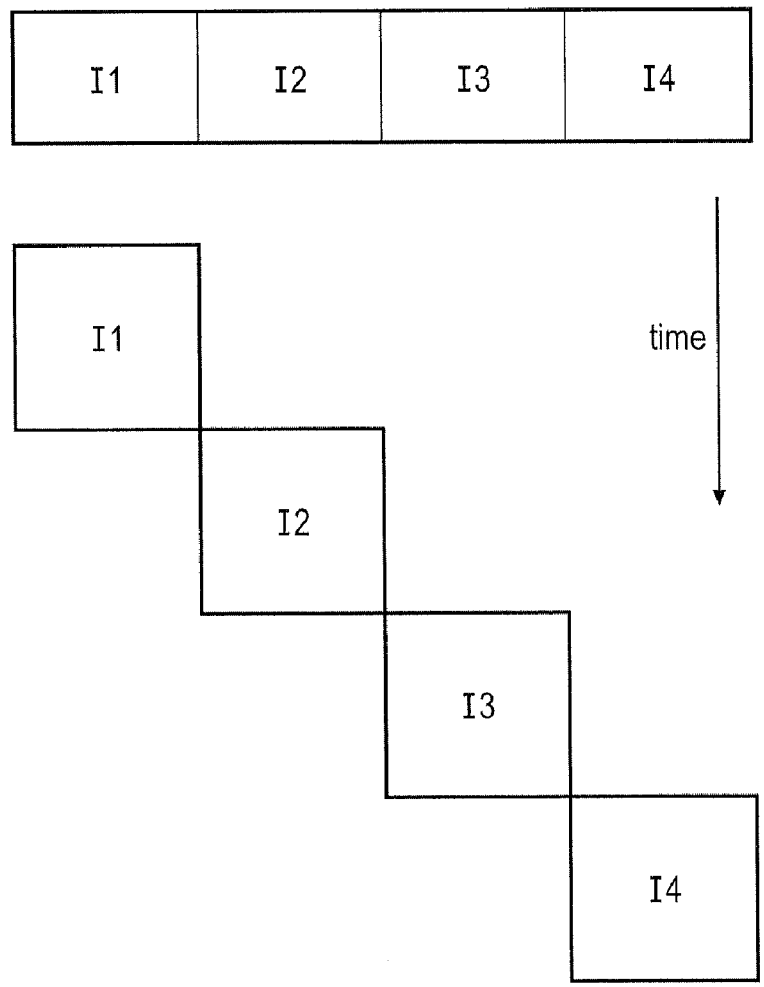
FIG. 3 is a schematic timing diagram illustrating the handling of four instructions.

FIG. 3 is a schematic timing diagram illustrating the handling of four instructions. Time is shown progressing from the top of the diagram towards the bottom. The vertical access is not drawn to scale, as the execution of the instructions has been expanded for clarity.

At the top of the diagram, there is shown a group of four instructions I1, I2, I3 and I4 being fetched and decoded. This operation occurs in parallel for all four instructions, and in the present embodiment takes two emulated clock cycles (one to fetch, one to decode).

Instructions are then executed. In the present embodiment I1 is executed before the execution of I2 commences, and so on, but in other embodiments the operations needed to emulate the execution of the instructions can be arranged to overlap to an extent. In either case the completion of the execution of I1 occurs before the completion of execution of I2, and so on. Although the vertical scale has been expanded for clarity, the execution of the four instructions I1 . . . I4 takes a total of four emulated clock cycles.

So, the fetching, decoding and execution of the four instructions has taken six emulated clock cycles.

Once the four instructions have been executed in the emulated system, a further four instructions can be fetched and decoded, and so on.

In the present embodiment, each cache page is four kilobytes long, and the instructions are each four bytes long. The groups of four instructions are arranged at sixteen byte boundaries so that the fetching of a group of four instructions never bridges two cache pages. This allows a more efficient use of the cache and avoids the system ever having to retrieve two cache pages from the main memory for a particular instruction fetch operation.

A four instruction group also allows a more efficient use of the vector (host) processor 110, which in this embodiment is capable of processing 16 byte values in a single parallel operation.

Figure 4:
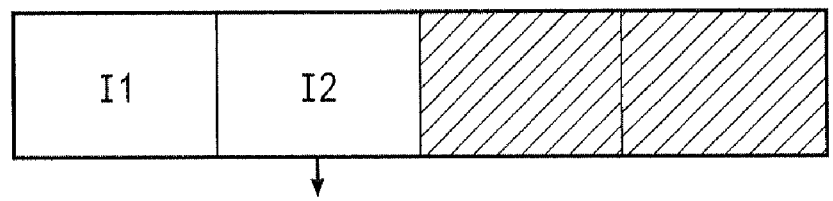
FIG. 4 schematically illustrates a grow of instructions having a branch instruction as a third instruction.
Figure 5:
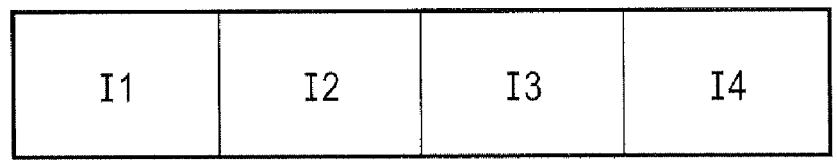
FIG. 5 is a schematic timing diagram illustrating the handling of the four instructions shown in FIG. 3.
Figure 5:
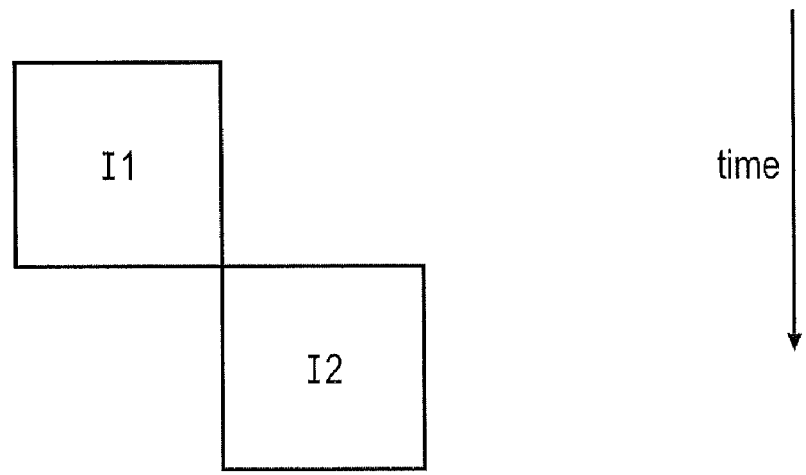
Figure 5:
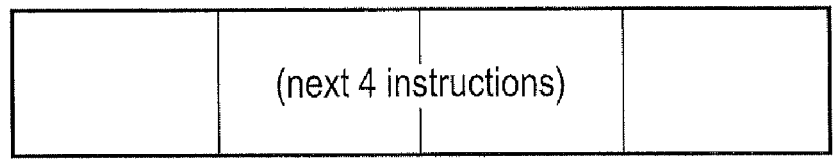

FIGS. 4 and 5 relate to the operation where one of the instructions (in this example, the instruction I2) is a branch instruction. This situation is shown schematically in FIG. 4, where an arrow indicates the instruction I2 branches the program flow to another position in memory, thus rendering the instructions I3 and I4 not required.

Referring to FIG. 5, all four instructions I1 . . . I4 are fetched and decoded as before. However, as soon as it becomes clear that the instruction I2 is a branch instruction, execution of the instructions I3 and I4 is aborted. At the end of the emulated execution of the instruction I2, the next four instructions (from the branch target address) are fetched and the process continues.

Figure 6:
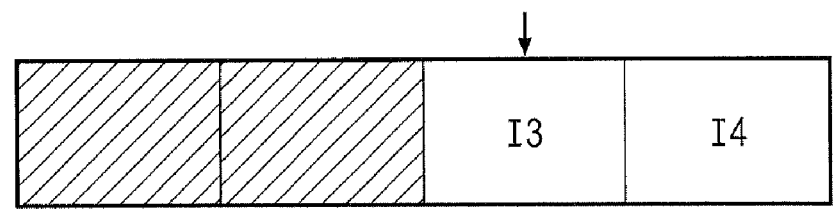
FIG. 6 schematically illustrates a group of instructions having a target instruction as a third instruction.

FIG. 6 schematically illustrates a group of instructions having a target instruction contained within the group. In this instance, a branch instruction executed elsewhere has caused the program flow to branch to one of the instructions in the group.

It would in principal be possible to fetch four instructions so that the target instruction was always the first of the group of four (i.e. instruction I1 in this notation) but this could lead to a breakdown of the convention described above which avoids fetching from multiple cache pages in a single operation. So, the sixteen byte boundaries are maintained, which could mean that any one of the four instructions in the group may be the target of the previous branch operation.

Figure 7:
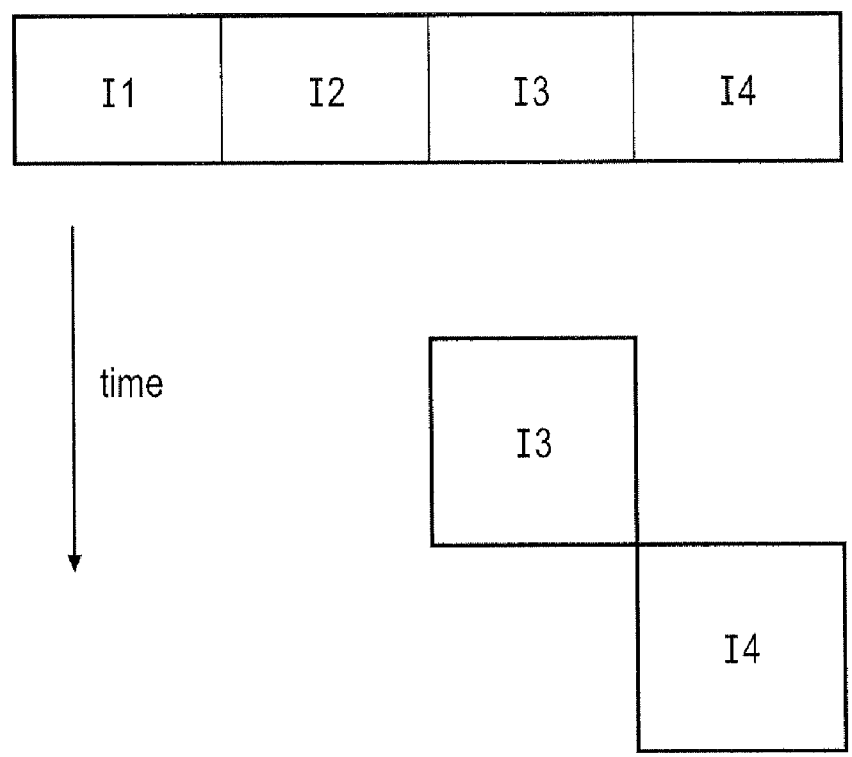
FIG. 7 is a schematic timing diagram illustrating the handling of the four instructions shown in FIG. 6.

In the present example of FIGS. 6 and 7, the third instruction I3 is the target. This means that the there is no point executing the instructions I1 and I2 in this particular group.

Referring to FIG. 7, all four instructions in the group are fetched and decoded as normal. There is no time penalty in fetching and decoding all four instructions, because this is parallel operation by the processor 110. However there is no point actually executing the decoded instructions I1 and I2, so as shown in FIG. 7, the execution of these two is prevented and execution starts with the instructions I3.

Figure 8:
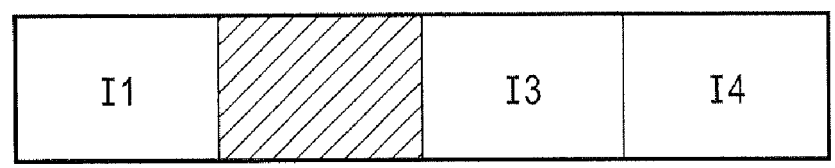
FIG. 8 schematically illustrates a group of instructions having an unexecutable instruction as a second instruction.
Figure 9:
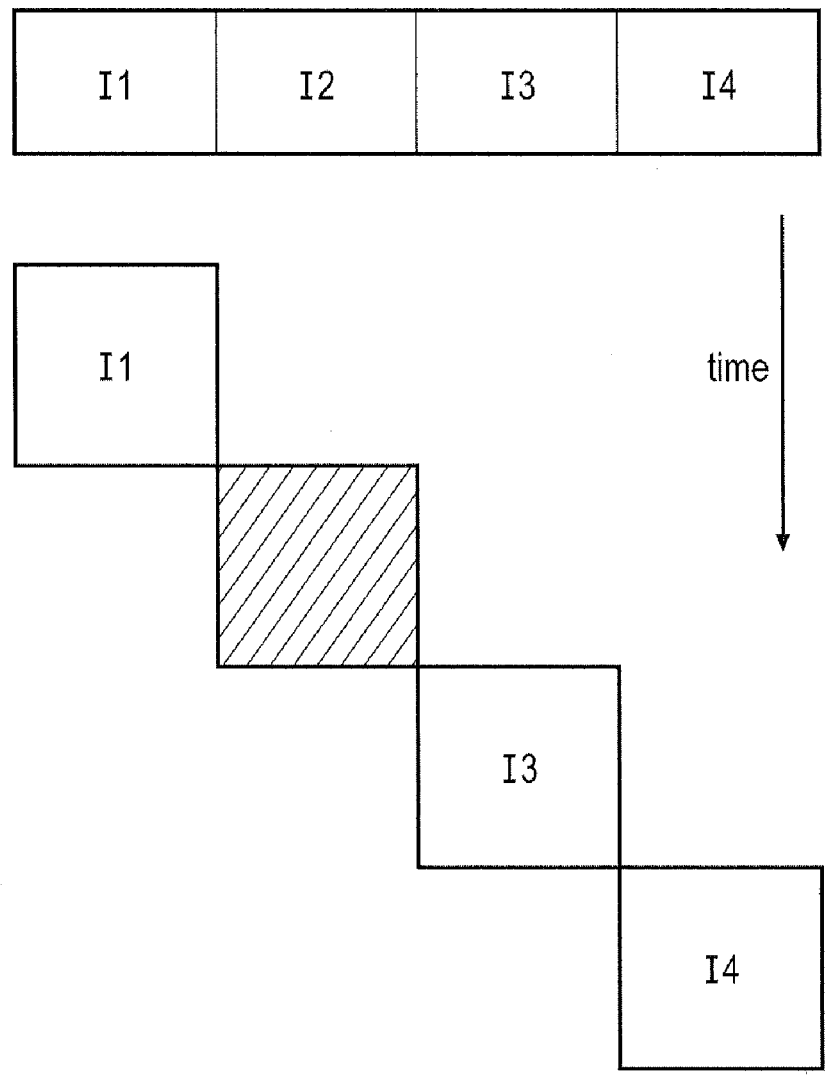
FIG. 9 is a schematic timing diagram illustrating the handling of the four instructions shown in FIG. 8.

The final example to be given of a break in program flow is shown in FIG. 8, where an unexecutable instruction I2 is included. An unexecutable instruction might contain a branch or a reference to a non-existent memory address or alike. Here, as shown in FIGS. 8 and 9, as soon as it becomes apparent that the instruction I2 cannot be executed, its execution is aborted. Depending on the nature of the problem, execution may continue with the instructions I3 and I4, or an exception situation may be initiated. For example, a branch may be made to an exception handling routine in an attempt to resolve the problem (whatever that is), with control then returning I2.

Although illustrative embodiments of the invention have been described in detail herein with reference to the accompanying drawings, it is to be understood that the invention is not limited to those precise embodiments, and that various changes and modifications can be effected therein by one skilled in the art without departing from the spirit and scope of the invention as defined by the appended claims.

I claim:

1. A data processor for emulating an instruction-handling processor, the data processor comprising:
   a cache memory comprising a plurality of cache lines and holding a plurality of instructions;
   a single vector processor for emulating a pipelined execution, the single processor being configured to operate in both an instruction preparation stage and an instruction execution stage;
   the instruction preparation stage comprising:
      selecting two or more instructions from the plurality of instructions, the number and position of instructions being selected so that the two or more instructions are retrieved from the same cache page, and
      generating a group of prepared instructions from the selected instructions, and
   the single processor is configured, during the instruction execution stage, to complete execution of each of the prepared instructions in the group serially in an instruction order;
   wherein, during the instruction preparation stage, the single vector processor is configured to fetch the two or more instructions in parallel.

2. The data processor according to claim 1, in which said instruction preparation stage comprises an instruction decoding stage which decodes the two or more fetched instructions in parallel.

3. The data processor according to claim 1, comprising software operable to check for interrupts in said emulated instruction-handling processor in response to execution of each group of prepared instructions.

4. The data processor according to claim 1, comprising logic to detect whether any of said prepared instructions need not be executed; and if so, to inhibit execution of such instructions.

5. The data processor according to claim 4, further comprising:
   logic to detect an instance of non-sequential program flow; and
   instruction canceling logic responsive to an instance of non-sequential program flow to cancel the execution of one or more instructions in the group of prepared instructions.

6. The data processor according to claim 5 in which, when said instance of non-sequential program flow relates to a branch instruction within said group of prepared instructions, said instruction canceling logic is arranged to cancel execution of any instructions in the group following said branch instruction.

7. The data processor according to claim 5 in which, when said instance of non-sequential program flow relates to a branch to a target instruction within said group of prepared instructions, the instruction canceling logic is arranged to cancel execution of any instructions in the group preceding said target instruction.

8. The data processor according to claim 1, in which said emulated instruction-handling processor has a pipelined operation involving at least an instruction preparation stage and an instruction execution stage.

9. The data processor of claim 1, wherein the cache memory of the data processor is smaller than a main memory of the instruction-handling processor.

10. The data processor of claim 1, wherein the cache memory comprises an instruction cache and a data cache.

11. The data processor of claim 10, wherein the data cache or the instruction cache comprise 8 pages of 4 kilobytes per page.

12. A data processing method for emulating an instruction-handling processor on a data processor, the data processor comprising a cache memory comprising a plurality of cache lines and holding a plurality of instructions, and a single vector processor for emulating a pipelined execution, the single processor being configured to operate in both an instruction preparation stage and an instruction execution stage, the method comprising the steps of:
   (a) in the instruction preparation stage selecting two or more instructions from the plurality of instructions, the number and position of instructions being selected so that the two or more instructions are retrieved from the same cache page, and
   (b) in the instruction preparation stage generating a group of prepared instructions from the selected instruction, and
   (c) in the instruction execution stage completing execution of each of the prepared instructions in the group serially in an instruction order;
   wherein, during the instruction preparation stage, the two or more instructions are fetched in parallel.

13. The data processing method of claim 12, wherein the cache memory of the data processor is smaller than a main memory of the instruction-handling processor.

14. The data processing method of claim 13, wherein the data cache or the instruction cache comprise 8 pages of 4 kilobytes per page.

15. A non-transitory computer-readable storage medium, the medium comprising:
   stored software for executing on a data processor a data processing method for emulating an instruction-handling processor, the data processor comprising a cache memory comprising a plurality of cache lines and holding a plurality of instructions, and a single vector processor for emulating a pipelined execution, the single processor being configured to operate in both an instruction preparation stage and an instruction execution stage;

the software executing the steps of:
(a) in the instruction preparation stage selecting two or more instructions from the plurality of instructions, the number and position of instructions being selected so that the two or more instructions are retrieved from the same cache page, and
(b) in the instruction preparation stage generating a group of prepared instructions from the selected instruction, and
(c) in the instruction execution stage completing execution of each of the prepared instructions in the group serially in an instruction order;
wherein, during the instruction preparation stage, the two or more instructions are fetched in parallel.

16. The non-transitory computer-readable storage medium of claim 15, wherein the cache memory of the data processor is smaller than a main memory of the instruction-handling processor.

17. The non-transitory computer-readable storage medium of claim 16, wherein the data cache or the instruction cache comprise 8 pages of 4 kilobytes per page.

* * * * *

UNITED STATES PATENT AND TRADEMARK OFFICE
CERTIFICATE OF CORRECTION

PATENT NO. : 7,983,894 B2  Page 1 of 1
APPLICATION NO. : 11/429410
DATED : July 19, 2011
INVENTOR(S) : Rabin Ezra It is certified that error appears in the above-identified patent and that said Letters Patent is hereby corrected as shown below:

Col. 3, Line 8, "grow" should read -- group --.

Col. 3, Line 53, "consuming DMA accesses." should read -- consuming) DMA accesses. --.

Col. 5, Line 23, "returning I2" should read -- returning to I2 --.

Signed and Sealed this
Twenty-eighth Day of August, 2012

David J. Kappos
*Director of the United States Patent and Trademark Office*